US012211981B2

(12) United States Patent
Kritzer et al.

(10) Patent No.: US 12,211,981 B2
(45) Date of Patent: Jan. 28, 2025

(54) ENERGY STORAGE SYSTEM

(71) Applicant: CARL FREUDENBERG KG, Weinheim (DE)

(72) Inventors: Peter Kritzer, Forst (DE); Reiner Dirr, Munich (DE); Olaf Nahrwold, Ludwigshafen (DE); Rudolf Gattringer, Tragwein (AT); Olivier Jeanne, St Junien (FR)

(73) Assignee: CARL FREUDENBERG KG, Weinheim (DE)

( * ) Notice: Subject to any disclaimer, the term of this patent is extended or adjusted under 35 U.S.C. 154(b) by 607 days.

(21) Appl. No.: 16/487,122

(22) PCT Filed: Jan. 15, 2018

(86) PCT No.: PCT/EP2018/050856
§ 371 (c)(1),
(2) Date: Aug. 20, 2019

(87) PCT Pub. No.: WO2018/153574
PCT Pub. Date: Aug. 30, 2018

(65) Prior Publication Data
US 2020/0058966 A1    Feb. 20, 2020

(30) Foreign Application Priority Data

Feb. 22, 2017  (DE) .................. 10 2017 001 683.6

(51) Int. Cl.
*H01M 10/613*   (2014.01)
*H01M 10/625*   (2014.01)
*H01M 10/6553*  (2014.01)

(52) U.S. Cl.
CPC ....... *H01M 10/613* (2015.04); *H01M 10/625* (2015.04); *H01M 10/6553* (2015.04)

(58) Field of Classification Search
CPC ..................... H01M 10/613; H01M 10/625
See application file for complete search history.

(56) References Cited

U.S. PATENT DOCUMENTS

| 9,312,571 | B2 * | 4/2016 | Wang ................ B60L 1/003 |
| 9,985,324 | B2 * | 5/2018 | Loew ............... H01M 10/6556 |
| 11,108,097 | B2 * | 8/2021 | Reimer ............ H01M 10/0585 |

(Continued)

FOREIGN PATENT DOCUMENTS

| CN | 103165954 A | 6/2013 |
| CN | 104508858 A | 4/2015 |

(Continued)

OTHER PUBLICATIONS

Engineering Tool Box Thermal Conductivity Fact Sheet (Year: NA).*

*Primary Examiner* — Jimmy Vo
(74) *Attorney, Agent, or Firm* — LEYDIG, VOIT & MAYER, LTD.

(57) ABSTRACT

An energy storage system includes: a housing, in which volume-variable storage cells are arranged; and a device for controlling a temperature of the storage cells, the device being assigned to the storage cells. The device has contact sections for contacting the storage cells. The device has flexible regions for adapting a position of the contact sections to a position of the storage cells. The contact sections adjoin the flexible regions.

12 Claims, 11 Drawing Sheets

(56) References Cited

U.S. PATENT DOCUMENTS

| | | | |
|---|---|---|---|
| 2011/0052960 A1* | 3/2011 | Kwon | H01M 10/0481 |
| | | | 429/120 |
| 2012/0177960 A1* | 7/2012 | Tasai | H01M 50/20 |
| | | | 361/535 |
| 2012/0261107 A1 | 10/2012 | Emmerich et al. | |
| 2012/0301772 A1* | 11/2012 | Hirsch | H01M 10/613 |
| | | | 429/120 |
| 2013/0004822 A1* | 1/2013 | Hashimoto | H01M 10/6554 |
| | | | 429/120 |
| 2013/0146249 A1 | 6/2013 | Katayama et al. | |
| 2013/0189558 A1* | 7/2013 | Haussmann | H01M 10/658 |
| | | | 429/120 |
| 2013/0288098 A1 | 10/2013 | Hamlett | |
| 2015/0125719 A1* | 5/2015 | Hongo | H01M 10/637 |
| | | | 429/50 |
| 2015/0270586 A1 | 9/2015 | Maguire et al. | |
| 2016/0006086 A1 | 1/2016 | Loew et al. | |
| 2016/0276718 A1 | 9/2016 | Bireau et al. | |
| 2022/0216538 A1* | 7/2022 | Haas | H01M 10/6557 |
| 2023/0168050 A1* | 6/2023 | Kuriyagawa | F28F 21/08 |
| | | | 165/186 |

FOREIGN PATENT DOCUMENTS

| | | | |
|---|---|---|---|
| DE | 102008059966 A1 | 6/2010 | |
| DE | 202012101076 U1 | 4/2012 | |
| DE | 102012222689 A1 | 6/2014 | |
| DE | 102013200774 A1 | 7/2014 | |
| DE | 102013201102 A1 | 8/2014 | |
| DE | 102015110669 A1 | 1/2017 | |
| DE | 102011075820 B4 * | 6/2018 | H01M 10/613 |

\* cited by examiner

ENERGY STORAGE SYSTEM

CROSS-REFERENCE TO PRIOR APPLICATIONS

This application is a U.S. National Phase application under 35 U.S.C. § 371 of International Application No. PCT/EP2018/050856, filed on Jan. 15, 2018, and claims benefit to German Patent Application No. DE 10 2017 001 683.6, filed on Feb. 22, 2017. The International Application was published in German on Aug. 30, 2018 as WO 2018/153574 under PCT Article 21(2).

FIELD

The invention relates to an energy storage system, comprising a housing, in which storage cells are arranged, wherein a device for controlling the temperature of the storage cells is assigned to the storage cells.

BACKGROUND

Energy storage systems—in particular, rechargeable batteries for electrical energy—are widely used in mobile systems in particular. Rechargeable batteries for electrical energy are also used in portable electronic devices such as smart phones and laptops. Furthermore, rechargeable batteries for electrical energy are increasingly used for providing energy for electrically-driven vehicles. Further fields of use of electrical energy storage systems are stationary applications, e.g., in backup systems, in network stabilization systems, and for storing electrical energy from renewable energy sources.

A frequently used energy storage system is a rechargeable battery in the form of a lithium-ion accumulator. Lithium-ion accumulators, like other rechargeable batteries for electrical energy, usually also have several storage cells which are installed together in a housing. Several electrically-interconnected storage cells form a module.

The energy storage system does not extend only to lithium-ion accumulators. Other rechargeable battery systems such as lithium sulfur batteries, solid batteries, or metal-air batteries may also require temperature control. The energy storage system can also be designed as a supercapacitor.

Energy storage systems in the form of rechargeable batteries exhibit the highest electrical capacitance only within a limited temperature spectrum. When the optimal operating temperature range is exceeded or undershot, the electrical capacitance of the storage drops sharply, or the functionality of the energy store is impaired. Moreover, excessively high temperatures can lead to damage to the energy storage system. Furthermore, uneven temperature control can lead to uneven aging of individual storage cells and thus to premature failure of the energy storage system.

This is particularly problematic when the energy storage system is used for providing electrical energy for electrically-driven vehicles. For temperature control of the cells of the energy storage system, it is therefore already known to provide cooling or heating elements for temperature control of the storage cells.

DE 10 2012 222 689 A1, for example, discloses the embedding of storage cells in a cell receptacle which is at least partially formed from a thermally-conductive material. In this case, the cell receptacle is rigid, wherein the storage cells are inserted into the cell receptacle.

In this case, it is problematic that the storage cells, in order to maintain the greatest possible heat transfer between the storage cells and the cell receptacle during assembly and intended use, may not change their position. If, for example, a tilting of the storage cells occurs during the course of assembly, a gap with a low heat transfer coefficient arises between the cell receptacle and the storage cell. This results in an uneven heat transfer, and thus a differing temperature control of the storage cells.

SUMMARY

In an embodiment, the present invention provides an energy storage system, comprising: a housing, in which volume-variable storage cells are arranged; and a device configured to control a temperature of the storage cells, the device being assigned to the storage cells, wherein the device has contact sections configured to contact the storage cells, wherein the device has flexible regions configured to adapt a position of the contact sections to a position of the storage cells, and wherein the contact sections adjoin the flexible regions.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
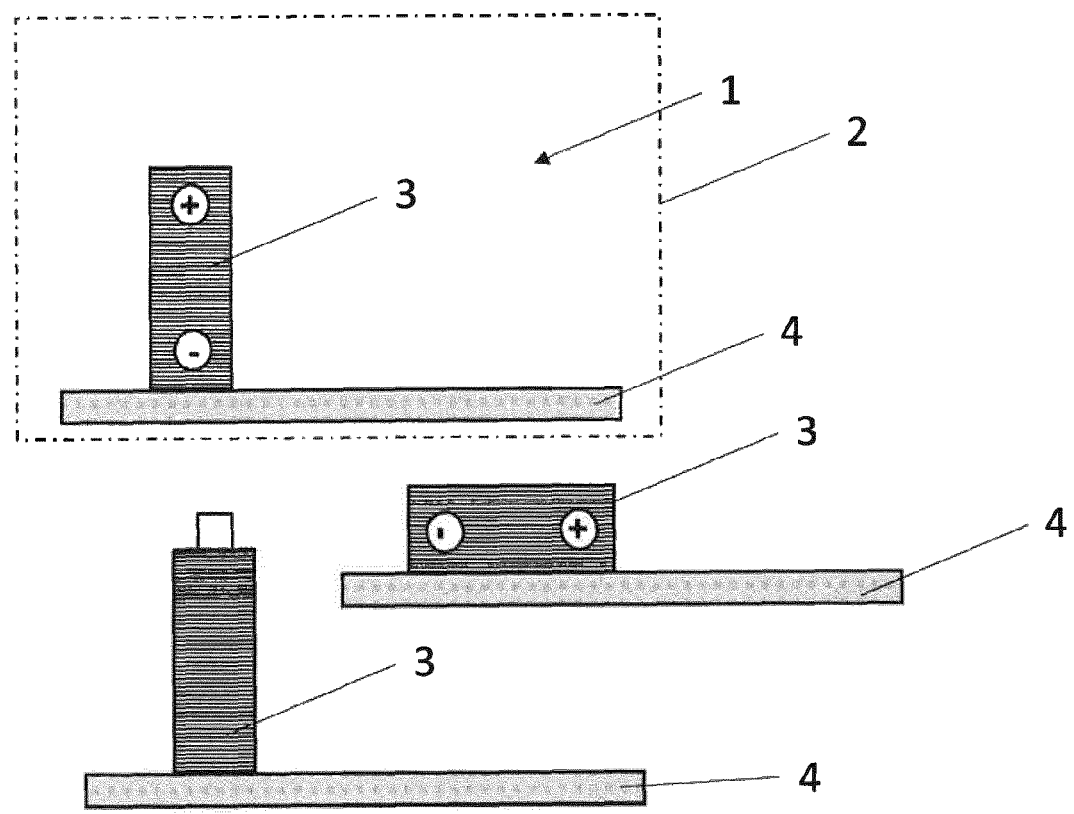
FIG. 1 shows an energy storage system with storage cells in the form of prismatic cells or round cells.

In an embodiment, the present invention provides an energy storage system in which a uniform and effective temperature control of the storage cells is ensured.

The energy storage system according to the invention comprises a housing in which volume-variable storage cells are arranged, wherein the storage cells are assigned a device for controlling the temperature of the storage cells. According to the invention, the device has contact sections for contacting the storage cells, wherein the contact sections adjoin the flexible regions, and the device has flexible regions for adapting the position of the contact sections to the position of the storage cells.

In this case, the contact sections are designed in such a way that they bear against the storage cell with a contact surface as large as possible, and thus ensure the highest possible heat transfer. Thereby, a high heat flow for heating or cooling the storage cells can be realized. The flexible regions of the device have the effect that the contact sections always bear against the storage cells in such a way that the largest possible heat flow can be realized there. The embodiment according to the invention prevents a thermally-insulating air gap from arising between the contact section and the storage cell. Furthermore, changes in position of the storage cells during assembly or during intended use of the energy storage system can be compensated for. In addition, the fact that the contact sections rest on each storage cell enables a uniform temperature control of all the storage cells.

In this respect, the energy storage system has comparatively rigidly formed contact sections for contacting the storage cells, which adjoin flexible regions for adapting the position of the contact sections to the position of the storage cells. In this respect, a preferred device has contact sections which are adapted to the position of the storage cells and are connected to one another via flexible regions. In an advantageous embodiment, the device is of planar design, wherein the contact sections are embedded in the device in an island shape.

In this case, the contact sections can contact bottom surfaces, or end faces and/or side surfaces of storage cells. Contact with bottom surfaces or end faces is particularly advantageous in connection with storage cells in the form of round cells. Contact with side surfaces is particularly advantageous in connection with storage cells in the form of prismatic cells and pouch cells.

The embodiment according to the invention also makes it possible to compensate for changes in shape of the storage cells during operation of the energy storage system. For example, an increase in volume occurs in a pouch cell during the charging process, which has an effect predominantly as an increase in thickness. A fully-charged pouch cell is about 5% thicker than a discharged pouch cell, the increase or decrease in volume being reversible. In addition, however, pouch cells also have an irreversible increase in volume when viewed over the service life. However, round cells and prismatic cells also exhibit a similar behavior. The shape change of the storage cell resulting from both the reversible as well as the irreversible volume change can be compensated for by the embodiment of the device according to the invention, so that a desired temperature control of the storage cells is always possible.

Cooling medium can flow through the device. The cooling medium can be, for example, water or a water-glycol mixture. If the energy storage system is used in a vehicle, it is conceivable to use the cooling medium used in the vehicle's air conditioning system as the cooling medium. With a corresponding design of the device, the cooling medium can also be carbon dioxide. The device can be connected to the air conditioning system or have a separate cooling circuit. The cooling medium improves the heat transfer and thus the performance of the device. In the sense of the invention, the cooling medium can also serve to heat the storage cells. This is particularly advantageous when the energy storage system has a temperature which is below the optimal operating temperature range because of low ambient temperatures.

The flexible regions of the device are preferably formed by elastically-deformable sections. As a result, the contact sections can be moved in the direction of the storage cells in order to achieve the best possible heat transfer.

The contact sections may be formed from a material having high thermal conductivity. High thermal conductivity in the sense of the invention results with a thermal conductivity of at least 2 W/m×K, and preferably of at least 5 W/m×K. This ensures a high heat transfer between the contact element and storage cell. Materials with high thermal conductivity are, for example, metals such as aluminum or copper and some plastics and ceramics.

The flexible regions may be formed from a material having low thermal conductivity. Thereby, heat flow between the adjacent storage cells can be prevented. Particularly in connection with the use of a cooling medium which flows in the interior of the device, it is advantageous if only the contact sections have a high thermal conductivity, and the flexible regions have the lowest possible thermal conductivity. As a result, only the regions which come into contact with the storage cells are temperature controlled, whereas the remaining regions, which require no temperature control, have only a low heat transfer. This is also advantageous from a safety perspective, since the heat released from a defective storage cell—for example, as a result of thermal runaway—is not transmitted to adjacent storage cells via the device.

The flexible regions can be made of plastic. In a corresponding embodiment, plastics are already inherently so elastic that the contact sections can be brought into complete contact with the storage cells. In this respect, the contact sections are movably fixed in the device. Such plastics are, for example, elastomers or thermoplastic elastomers. Alternatively, however, it is also conceivable to design the flexible regions in such a way that rigid plastics such as polyamide can also be used. In this context, it is, in particular, conceivable to provide movement edges or beads in the flexible regions.

The flexible regions may, alternatively, also be formed from metallic material. This is especially conceivable when structurally movable regions are provided. This can be done by beading or a comparatively three-dimensional design of the flexible regions. In this context, it is, in particular, conceivable to profile the flexible regions.

The contact sections preferably consist of metallic material having high thermal conductivity. In this context, it is, in particular, conceivable to form the contact sections from aluminum or copper. However, it is likewise conceivable to provide plastics with high thermal conductivity in the contact sections. Such plastics are, for example, thermally-conductive thermoplastics or elastomers. The contact sections can be formed from electrically-insulating, but thermally-conductive ceramic materials such as aluminum oxide.

The surface of the device facing the storage cells—in particular, the surface of the contact sections facing the storage cells—may have electrically-insulating properties. This is then advantageous, in particular, when the surface of the storage cells represents an electrical pole. The electrically-insulating properties can be achieved by an additional electrically-insulating layer. The layer can also improve the thermal conductivity. In this context, a coating containing thermally-conductive ceramics such as aluminum oxide is conceivable. Polymeric coatings containing electrically-insulating, but thermally-conductive fillers are also conceivable.

The contact sections may be rigid and/or flexible. A flexible design is advantageous in the case of shape changes such as bulges in the contact region of the storage cell—for example, due to charging processes or aging. Due to the flexible design of the contact sections, the contact sections can follow the shape changes of the storage cells and thereby ensure a large contact surface. Flexible contact sections can be realized by thin metal sheets, thermoplastics, elastomers, or thermoplastic elastomers.

The cooling medium can be pressurized. In this case, it is particularly advantageous that the flexible regions move together with the contact sections when the cooling medium is pressurized. This makes it possible to ensure that the contact sections bear against the storage cells. In this context, it is conceivable to regulate the pressure prevailing in the device as a function of the temperature and/or the state of charge of the storage cells. As a result, the contact sections can always be brought into contact with the storage cells. At the same time, the storage cells are prevented from being damaged by an excessively high contact force of the contact sections.

In the case of a defective storage cell, e.g., as a result of what is known as thermal runaway, in a short time, very large amounts of heat are released which cannot be dissipated via the device. In order to prevent the heat released thereby from leading to overheating of the device or, in general, of the energy storage system with the remaining storage cells, the contact sections can be moved away from the storage cells. This can be done, for example, by reducing the pressure of the cooling medium. In this case, the flexible sections move the contact sections away from the storage cell, so that a thermally-insulating gap is produced. The movement of the contact sections can take place due to the restorative forces of the elastically-deformed, flexible sections. In this embodiment, the pressure of the cooling medium is regulated and adapted to the respective operating state. A complete failure of the energy storage system can thereby be prevented.

The surface, facing the cooling medium, of the contact sections can be structured. As a result, the active surface assigned to the cooling medium can be enlarged, so that the heat transfer is also increased.

The side of the device facing away from the storage cells can be formed from a thermally-insulating material or be provided with a thermally-insulating layer. This ensures that temperature control by the device takes place only in the direction of the storage cells. This is particularly advantageous when the energy storage system is arranged in an electric vehicle. In this case, the device is less susceptible to the environment—for example, a hot or cold vehicle floor.

The energy storage system according to the invention is particularly suitable for use in a mobile system, e.g., in an electric vehicle, but also in aircraft and rail vehicles.

FIG. 1 shows an energy storage system 1, comprising a housing 2, in which storage cells 3 are arranged, wherein a device 4 for controlling the temperature of the storage cells 3 is assigned to the storage cells 3. The energy storage system 1 is a lithium-ion accumulator. The storage cells 3 are in the form of prismatic cells. In the upper representation, the storage cell 3 is contacted laterally by the device 4. In the middle representation, the storage cell 3 is arranged lying on the device 4, and, in the lower representation, the storage cell 3 is arranged standing on the device 4. The lower representation can also be regarded as a storage cell 3 in the form of a round cell standing on the device 4.

Figure 2:
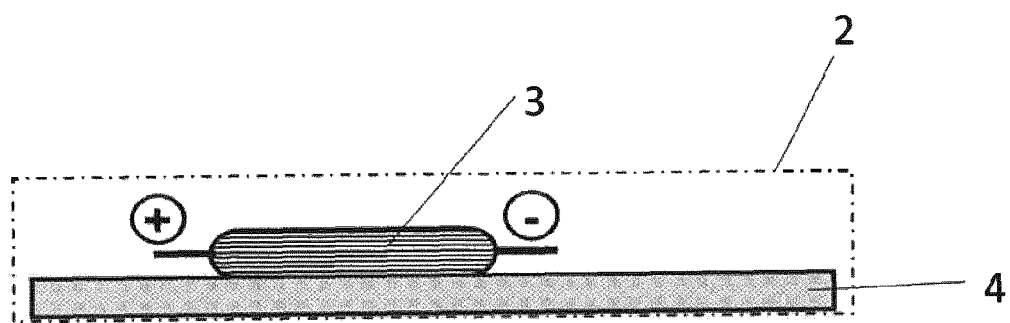
FIG. 2 shows an energy storage system with storage cells in the form of pouch cells.

FIG. 2 shows an energy storage system 1, comprising a housing 2, in which storage cells 3 are arranged, wherein a device 4 for controlling the temperature of the storage cells 3 is assigned to the storage cells 3. The energy storage system 1 is a lithium-ion accumulator. The storage cells 3 are in the form of pouch cells.

Figure 3:
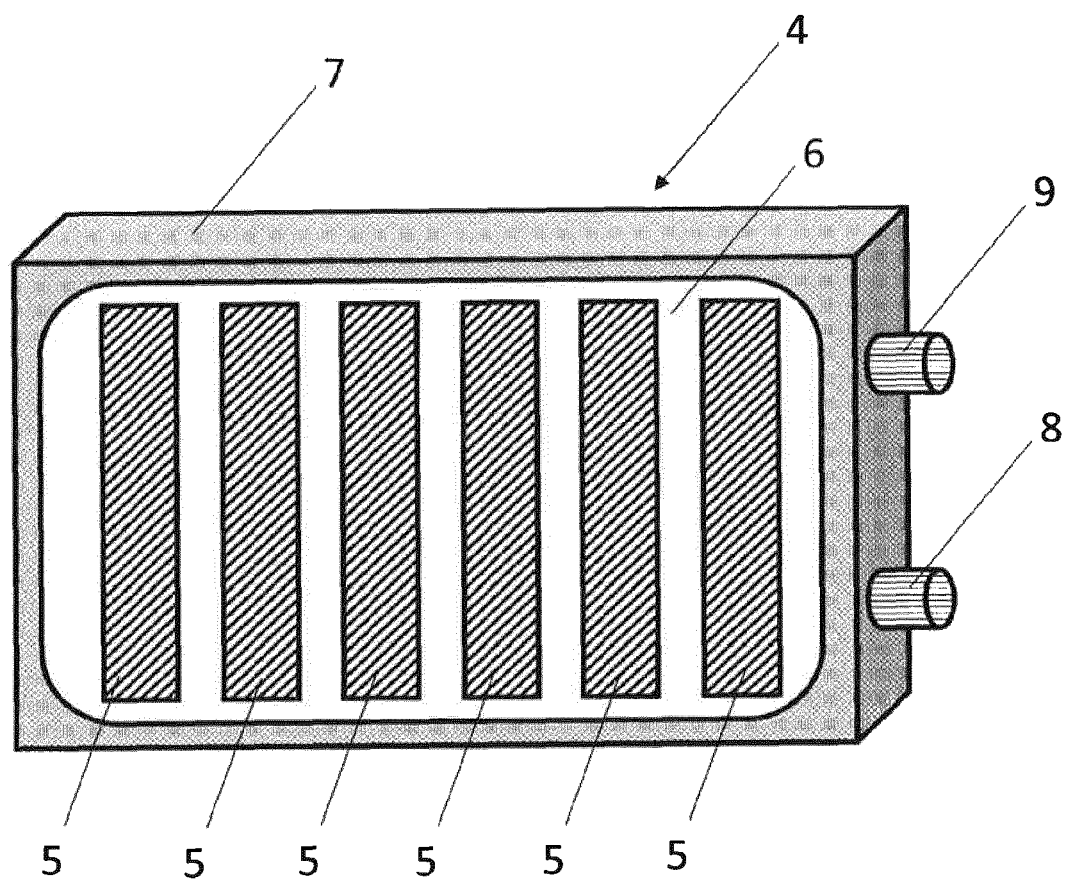
FIG. 3 shows a device with embedded, strip-shaped contact sections.

FIG. 3 shows in detail a device 4 for controlling the temperature of storage cells 3 of an energy storage system 1.

The device according to FIG. 3 has a frame 7 which is provided with a first connection 8 and a second connection 9 for introducing or discharging cooling medium. In this respect, cooling medium can flow through the device 4. The cooling medium can be pressurized.

Contact sections 5 for contacting the storage cells 3 are arranged on a main side of the device 1, wherein the contact sections 5 are surrounded by flexible regions 6 for adapting the position of the contact sections 5 to the position of the storage cells 3. The flexible regions 6 are formed by elastically-deformable sections and, in the present embodiment, consist of plastic—here, an elastomer. The material is formed in such a way that the flexible regions 6 have a low thermal conductivity. By means of the flexible regions 6, the contact sections 5, with increasing pressure of the cooling medium, bear against the storage cells 3.

The contact sections 5 are formed from a material having high thermal conductivity and consist of metallic material in the present embodiment.

Figure 4:
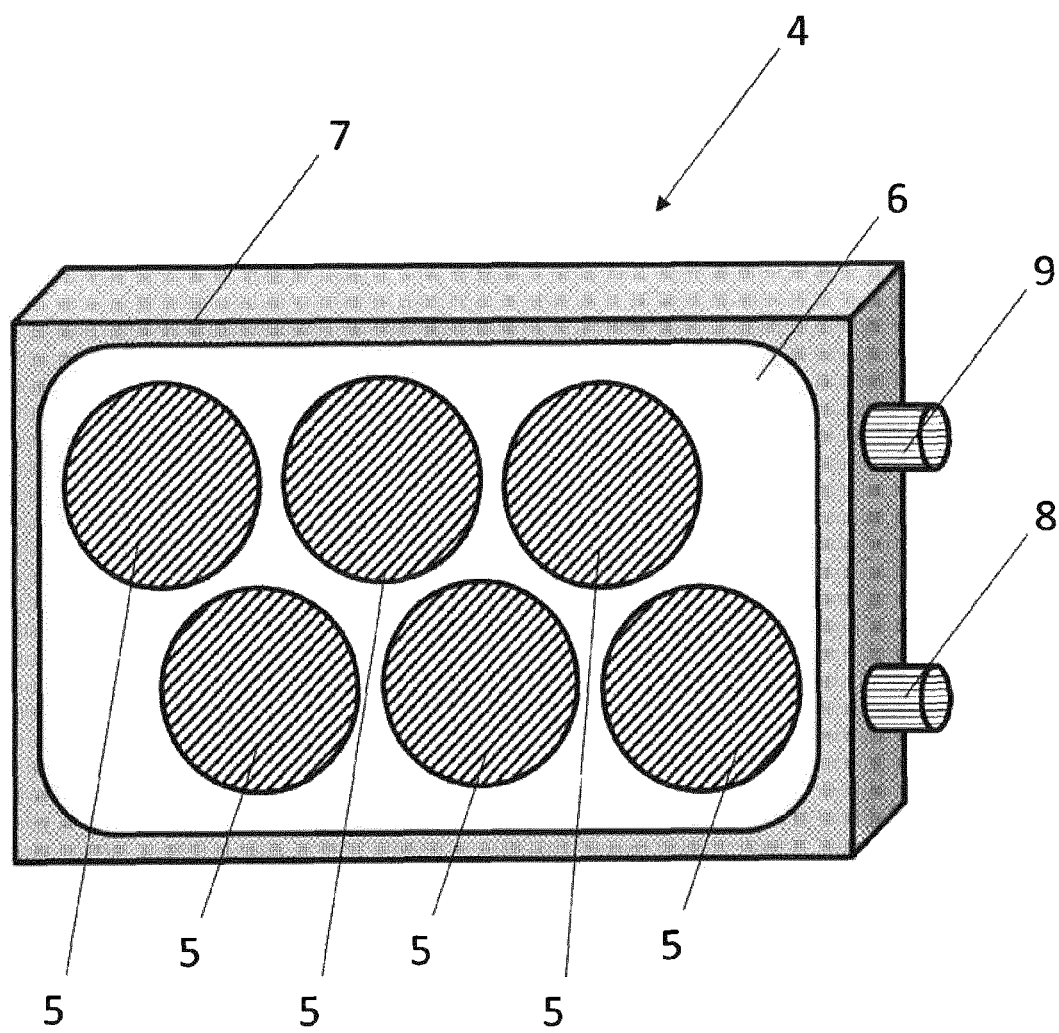
FIG. 4 shows a device with embedded, round contact sections.

FIG. 4 shows a device 4 according to FIG. 3, wherein, in the present embodiment, the contact sections 5 are likewise round in shape for adaptation to the storage cells 3 in the form of round cells.

Figure 5:
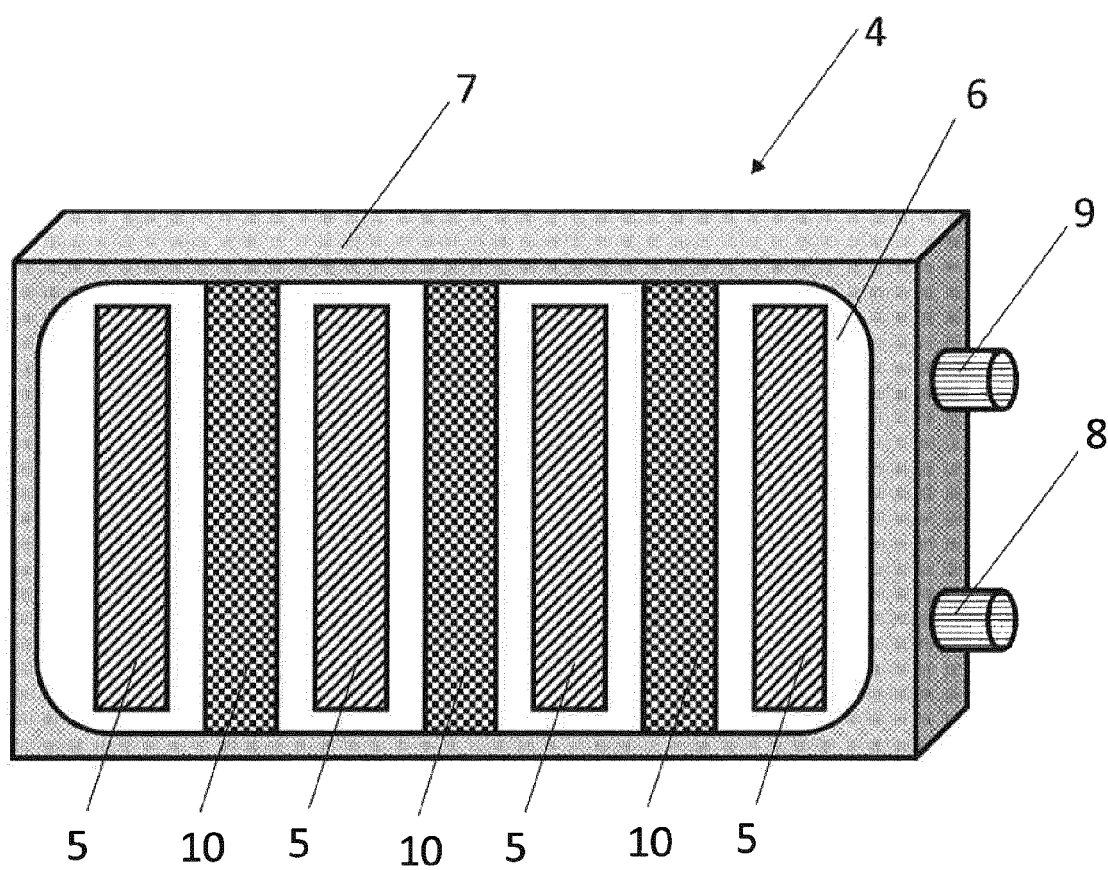
FIG. 5 shows a device with embedded, strip-shaped contact sections arranged between support sections.

FIG. 5 shows a device 4 for controlling the temperature of storage cells 3 of an energy storage system 1. The device according to FIG. 3 has a frame 7 which is provided with a first connection 8 and a second connection 9 for introducing or discharging cooling medium. In this respect, cooling medium can flow through the device 4. The cooling medium can be pressurized.

Contact sections 5 for contacting the storage cells 3 are arranged on a main side of the device 1, wherein the contact sections 5 are surrounded by flexible regions 6 for adapting the position of the contact sections 5 to the position of the storage cells 3. The flexible regions 6 are formed by elastically-deformable sections and, in the present embodiment, consist of plastic—here, a thermoplastic elastomer. Thereby, the flexible regions 6 are formed as a membrane, so that the contact sections 5 are movably mounted.

The material is formed in such a way that the flexible regions 6 have a low thermal conductivity. By means of the flexible regions 6, the contact sections 5, with increasing pressure of the cooling medium, bear against the storage cells 3.

The contact sections 5 are formed from a material having high thermal conductivity and consist of metallic material in the present embodiment.

The contact sections 5 are adapted to the shape of the storage cells 3 and are of strip-shaped design. Between the contact sections 5, support sections 10 are arranged which form a web and are fixed to the frame 7. Storage cells 3 can be mounted on the support sections 10 and on the frame 7 so that they are mechanically fixed securely on the device 4. In this case, the storage cells 3 cover the contact sections 5 which, due to embedding in the flexible region 6, can bear against the storage cells 3 for temperature control. This embodiment results in a particularly stable device.

Such a configuration is also conceivable together with storage cells 3 in the form of round cells. In this case, the support sections 10 are preferably designed as a perforated plate, wherein the flexible region 6 is adjacent to the support section 10, and the contact section 5, in turn, is embedded in the flexible region.

Figure 6:
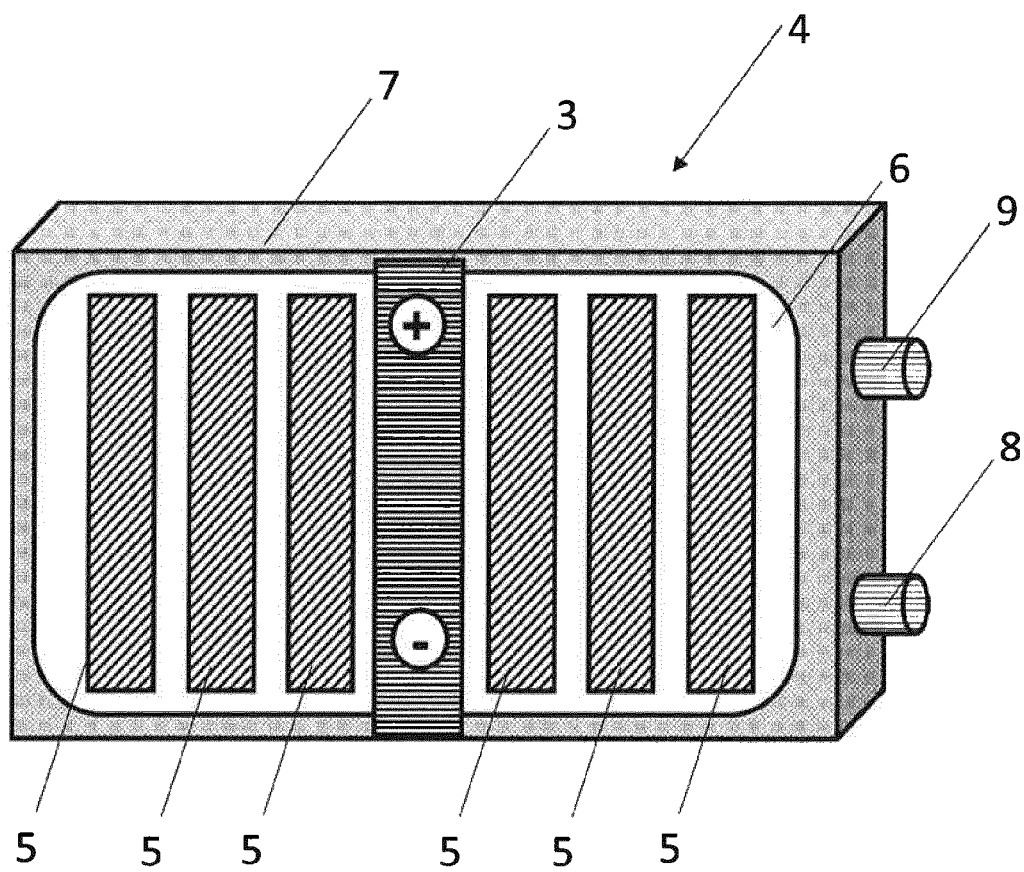
FIG. 6 shows a device in which the storage cell is resting on the edge section of the device.

FIG. 6 shows an embodiment according to FIG. 3, wherein, in the present embodiment, the device 4 is designed such that the storage cell 3 rests on the frame 7 and is thus supported in a mechanically stable manner.

Figure 7:
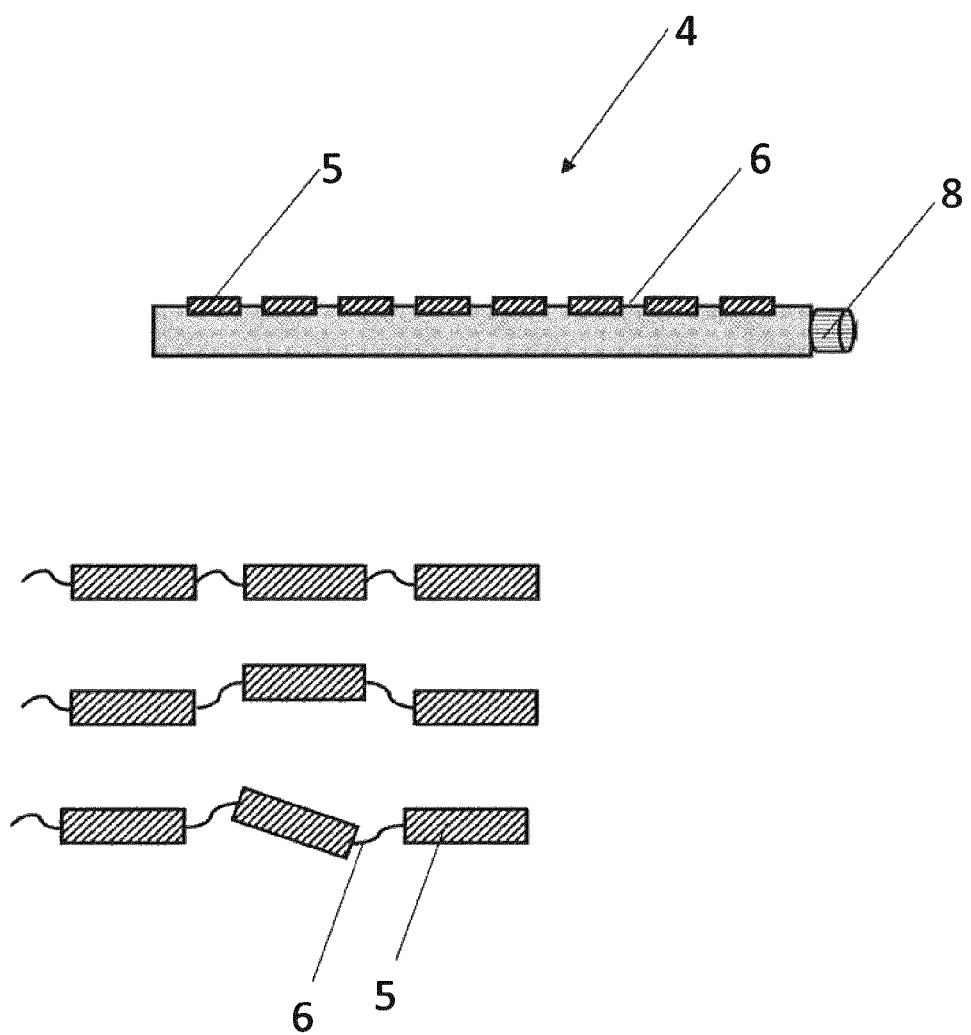
FIG. 7 shows a side view of a device.

FIG. 7 shows the device 4 described above in the side view. Alternatively, the flexible regions 6 are formed from metallic material, wherein the flexible regions 6 are formed from sheet metal with a low wall thickness, and beads are introduced into the sheet metal in order to increase the mobility, so that the flexible regions 6 are profiled.

The surface, facing the cooling medium, of the contact sections 5 is structured. The structuring can take place in the course of shaping or, subsequently, by embossing or laser structuring.

Figure 8:
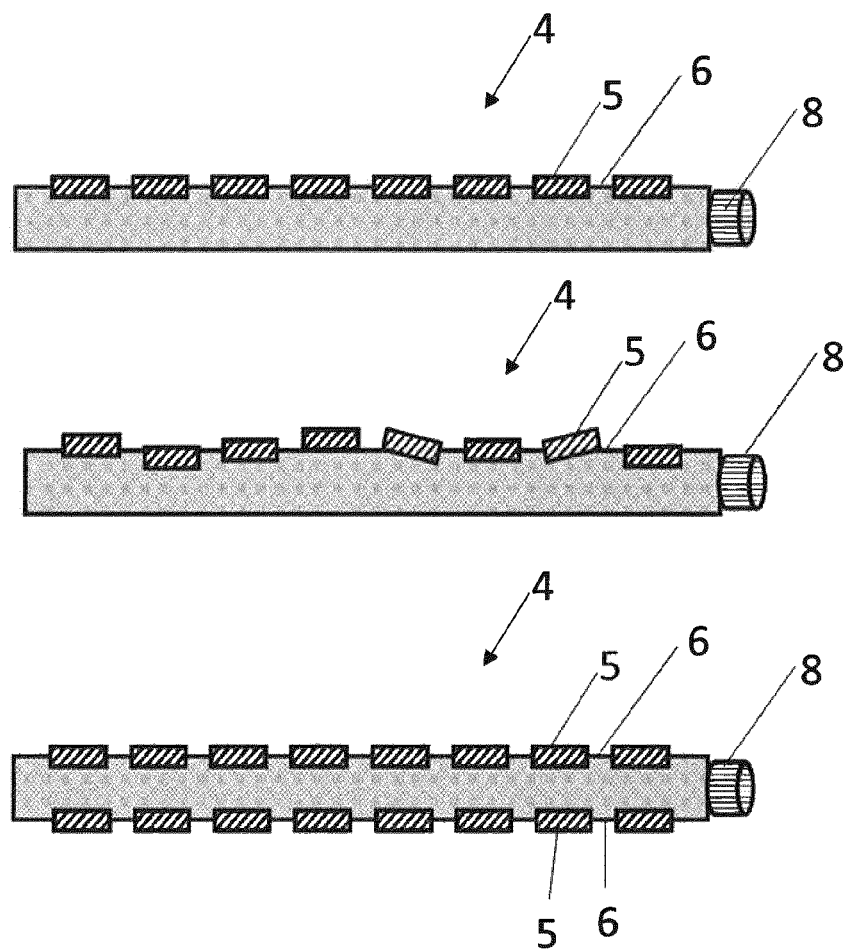
FIG. 8 shows various embodiments of a device.

FIG. 8 shows further embodiments of the device 4. The upper embodiment shows a device 4 in the initial state, while the middle representation shows a deformed device 4 with offset contact sections 5.

The lower representation shows a device 4 in which contact section 5 and flexible regions 6 are arranged on both main sides of the device 4. Such a device 4 is, in particular, suitable for being arranged between the storage cells 3.

Figure 9:
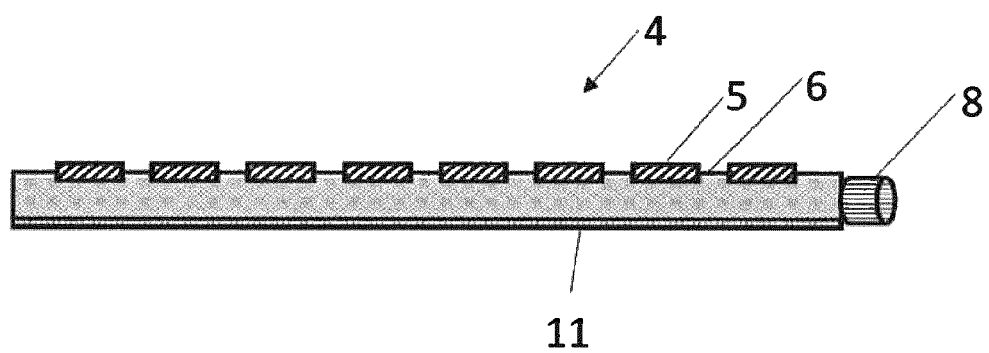
FIG. 9 shows a device with a floor-side insulation.

FIG. 9 shows an embodiment of a device 4 having a thermally-non-conductive rear side in the form of an insulating layer 11. The insulating layer 11 may be formed integrally from a plastic housing. The insulating layer of thermally-insulating material is arranged on the main side, facing away from the storage cells 3, of the device 4 and reduces the influence of the environment on the performance of the device 4.

Figure 10:
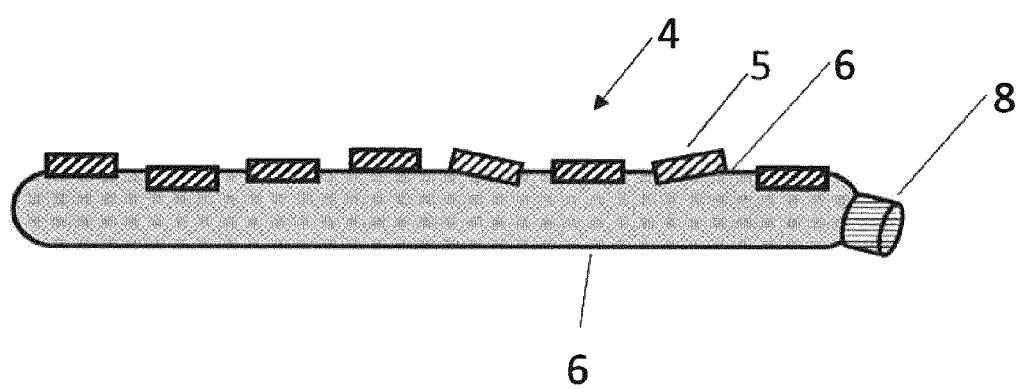
FIG. 10 shows a device with a flexible sheath.

FIG. 10 shows an embodiment of a device 4 in which the frame 7 consists entirely of flexible material. Such a device 4 can be designed, for example, as an insert part for a pre-formed frame or for a base plate. The temperature control, in turn, takes place through recesses in the base plate. Here, the lower side can again be designed to be thermally insulating—for example, by an arrangement of porous substances such as foams or non-wovens. Furthermore, the very high flexibility of the connections is advantageous here. These can ensure, for example, tolerance compensation of the piping system, whereby transition pieces for piping can be dispensed with.

Figure 11:
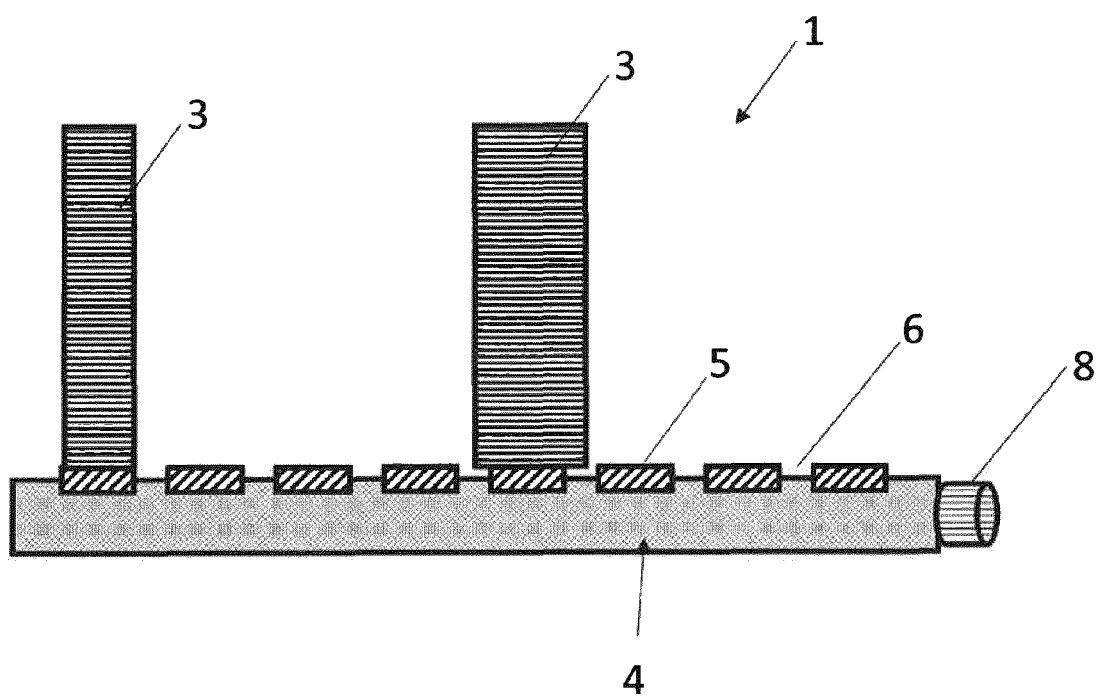
FIG. 11 shows a device with differently-dimensioned storage cells.

FIG. 11 shows various possibilities of arranging storage cells 3 on the contact sections 5 of the device 4. In this case, it is conceivable to design the contact sections 5 to be larger, the same, or even smaller in terms of surface area than the contacted storage cells 3. Although a smaller area does indeed initially reduce the heat transfer, it can better compensate for tolerances.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An energy storage system, comprising:
 a housing, in which volume-variable storage cells are arranged;
 a device configured to control a temperature of the storage cells, the device being assigned to the storage cells, the device comprising a frame; and
 a cooling medium flowable through the device, wherein the cooling medium is pressurizable
 wherein the device has rigidly formed contact sections configured to contact the storage cells,
 wherein the device has flexible regions configured to adapt a position of the contact sections to a position of the storage cells, the flexible regions being disposed between the frame and the contact sections so as to surround each contact section,
 wherein the contact sections adjoin the flexible regions, the contact sections being interconnected via the flexible regions,
 wherein the flexible regions of the device comprise elastically-deformable sections,
 wherein the flexible regions have a different thermal conductivity than the contact sections, and
 wherein the contact sections, with increasing pressure of the cooling medium, bear against the storage cells.

2. The energy storage system according to claim 1, wherein the contact sections comprise a material having high thermal conductivity.

3. The energy storage system according to claim 1, wherein the flexible regions comprise a material having a thermal conductivity of less than at least 2 W/m×K.

4. The energy storage system according to claim 1, wherein the flexible regions comprise a plastic.

5. The energy storage system according to claim 1, wherein the flexible regions comprise an elastomer or a thermoplastic elastomer.

6. The energy storage system according to claim 1, wherein the flexible regions comprise a metallic material.

7. The energy storage system according to claim 1, wherein the flexible regions are profiled.

8. The energy storage system according to claim 1, wherein the contact sections are configured to move away from the storage cells as a pressure of the cooling medium drops.

9. The energy storage system according to claim 1, wherein a surface of the contact sections facing the cooling medium is structured.

10. The energy storage system according to claim 1, wherein the contact sections are configured to contact the cooling medium.

11. A mobile system, comprising:
 the energy storage system according to claim 1.

12. The mobile system according to claim 11, wherein the mobile system comprises a vehicle.

* * * * *